United States Patent [19]

Gustavson

[11] 4,210,852
[45] Jul. 1, 1980

[54] ELECTRIC NUTRUNNER

[75] Inventor: Fredrik Gustavson, Täby, Sweden

[73] Assignee: Atlas Copco Aktiebolag, Nacka, Sweden

[21] Appl. No.: 967,139

[22] Filed: Dec. 7, 1978

Related U.S. Application Data

[63] Continuation of Ser. No. 739,711, Nov. 8, 1976, abandoned.

[30] Foreign Application Priority Data

Nov. 14, 1975 [SE] Sweden ................... 7512866

[51] Int. Cl.² .............................................. H02P 3/00
[52] U.S. Cl. ..................... 318/459; 318/432; 318/368; 318/434
[58] Field of Search ............... 318/432, 433, 434, 331, 318/302, 379, 368, 459, 476, 477; 173/12

[56] References Cited

U.S. PATENT DOCUMENTS

| | | | |
|---|---|---|---|
| 2,600,549 | 6/1952 | Ledbetter | 81/52.4 R |
| 3,331,004 | 7/1967 | Brown | 318/331 |
| 3,463,991 | 8/1969 | Yuminaka | 318/379 |
| 3,477,007 | 11/1969 | Ducommun et al. | 318/459 |
| 3,501,684 | 3/1970 | Webb | 318/302 |
| 3,571,683 | 3/1971 | Prezzi et al. | 318/368 |
| 3,845,373 | 10/1974 | Totsu et al. | 318/476 |
| 3,892,146 | 7/1975 | Yasoshima | 173/12 |

Primary Examiner—David Smith, Jr.
Attorney, Agent, or Firm—Frishauf, Holtz, Goodman & Woodward

[57] ABSTRACT

An electric nutrunner for tightening bolt joints to a desired tightening torque. The nutrunner utilizes a motor having a low moment of inertia and a control device that supplies a pulse to the motor as an indication that the nut-tightening is to be terminated, thereby braking the motor electrically.

13 Claims, 13 Drawing Figures

ELECTRIC NUTRUNNER

This is a continuation of application Ser. No. 739,711, filed Nov. 8, 1976, now abandoned.

BACKGROUND OF THE INVENTION

1. Field of the Invention

This invention refers to an electric nutrunner for tightening bolt joints to a desired tightening torque or clamping force.

2. Description of the Prior Art

In tightening a bolt joint two different phases may be observed. The first phase comprises the initial threading sequence, which can be said to be tightening without increasing the torque. In the second phase, the tightening sequence proper, the components of the joint are clamped together, and the torque will then have to increase continuously so as to make the tightening continue. These two phases are illustrated in FIG. 1, wherein the torque M is shown as a function of the angle of rotation $\theta$, with portion I referring to the initial threading sequence whereas portion II refers to the tightening sequence.

In mechanical tightening, i.e. tightening with a motorpowered nutrunner, the initial threading is carried out at a high angular velocity. During the tightening proper, the angular velocity of the driving pin will decrease progressively down to zero. This is illustrated in FIG. 2, wherein the angular velocity $(d\theta)/(dt)$ is shown as a function of time t, with the portion I representing the initial threading sequence whereas the portion II represents the tightening sequence.

Thus, during the tightening, the rotating parts of the nutrunner and the joint are braked, with the torque generated by the motor being supplemented by a deceleration torque $-J(d^2\theta)/(dt^2)$, the magnitude of which is dependent of the inertia factor J of the rotating components and the rate of the deceleration $-(d^2\theta)/(dt^2)$. Therefore, the torque delivered to the joint can generally be described by the following expression:

$$M_F = M_M - J(d^2\theta)/(dt^2) \qquad (1)$$

wherein $M_F$ = the torque delivered to the joint, $M_M$ = the part of the torque delivered to the joint derived from the torque generated in the motor, J = the total of the rotational moment of inertia of all of the rotating components reduced to the driving pin of the machine, $\theta$ = the angle of rotation of the driving pin of the machine, and t = time.

In an ordinary pneumatic nutrunner the torque delivered by the motor is determined by the pressure of the supply air. In FIG. 3 the torque M is shown as a function of time t for a hard joint, with the relationship being indicated by characteristic I, and a soft joint, with which the relationship is illustated by characteristic II. Thus, the torque $M_F = M_M - J(d^2\theta)/(dt^2)$ delivered to the joint will be dependent of the hardness of the joint as this hardness influences the dynamic additive torque $-J(d^2\theta)/(dt^2)$, which is dependent of the rate of the braking. Said additive torque is substantial in hard joints but practically negligable in soft joints. The fact that the total torque $M_F$ is dependent of the hardness of the joint comprises a drawback whose elimination is being attempted in various ways.

One method of avoiding the above-mentioned drawback is to disconnect the motor drive at certain level of the delivered torque of the motor and if possible to select this level such; that it is adjusted to the specific joint hardness in each individual case. To accomplish this, a nutrunner is provided with some device for measuring the delivered torque directly or indirectly, and at a predetermined level $M_n$ turning off or disengagement of the motor is initiated. The tightening sequence of a hard joint will then have the appearance of FIG. 4, the upper portion of which illustrates the torque M as a function of time t, whereas its lower portion shows the angular velocity $(d\theta)/(dt)$ as a function of time. If $t_n$ designates the point at which disengagement or stopping of the motor is initiated, a torque of $M_n - J(d^2\theta/dt^2)_n$ will have been delivered to the joint at that point. However, the final torque $M_s$ delivered to the joint will be greater. At the point $t_n$, the motion of the motor will not have ceased, and the driving pin will have an angular velocity of $(d\theta/dt)_n$. Consequently, the rotating system will have a stored kinetic energy equal to $W_n = \frac{1}{2}J(d\theta^2/dt_n)$.

Depending on the design of the system, this energy will in its entirety or in part be supplied to the joint as an additive torque $M_x$.

Consequently, the resulting final torque $M_s$ will be $$M_s = M_n - J(d^2\theta/dt^2)_n + M_x$$

In accordance with the invention, precise control of the tightening sequence is achieved by means of equipment consisting of a nutrunner and an assoicated control system up to a final torque of $M_s$ which is not affected by the hardness of the joint, said equipment being of such nature that $M_n$ can be measured with great exactness, the term $-J(d^2\theta/dt^2)_n$ is minimized not only by a low value of J but also by compensating for the varying joint hardness by the control equipment, $M_x$ is minimized not only by the low value of J but also by a portion of the kinetic energy $\frac{1}{2}J(d\theta/dt)^2_n$ being braked away.

The above-mentioned precise control is achieved by utilizing an electric nutrummer having a low moment of inertia, furthermore a drive circuit for the motor of the nutrunner designed in such manner that the motor is braked by short-circuiting, wherein the tightening is interrupted, and a specific circuit in which the growth of the torque can be sensed in order that the additive torque $-J(d^2\theta/dt^2)_n$ may be compensated. As an example of a particularly appropriate motor a so-called permanently magnetized direct-current motor may be mentioned (PMLs motor), which has the characteristic that its delivered torque is directly proportional to the drive current, i.e. $M_{motor} = k \cdot i$, wherein k is a motor constant and i is the motor current. Thus it is simple to measure $M_{motor}$ by measuring the current, which for example may be expressed as the voltage drop over a resistor in series with the motor. By sensing the growth of the current $(di)/(dt)$ during the tightening, for instance by measuring the voltage drop over an inductor in series with the motor, it becomes possible to compensate for the term $-J(d^2\theta)/(dt^2)$. This will be described more specifically below.

As the result of new magnetic materials being rapidly developed, for example of the type of rare earth metal/- cobolt, it has become possible to design motors having substantially smaller dimensions than with magnetic materials of the types presently in use.

By selecting a PMLs motor of the so-called moving coil type, i.e. a motor in which solely the winding and not the iron core rotates, a system having an extremely low moment of inertia is achieved, i.e. the term $M_x$ becomes small.

SUMMARY OF THE INVENTION

The present invention provides an electric nutrunner for tightening bolt joints to a desired tightening torque or clamping force, wherein the nutrunner disclosed by the invention is characterized in that it comprises a motor preferably having a low moment of inertia and in that said motor is braked, preferably electrically, when a pulse from a control device indicates that the tightening is to be terminated. Additional features are indicated in the accompanying claims.

BRIEF DESCRIPTION OF THE DRAWINGS

The invention will now be described more specifically with reference to the accompanying drawings, in which.

DESCRIPTION OF THE PREFERRED EMBODIMENTS

Figure 5A:
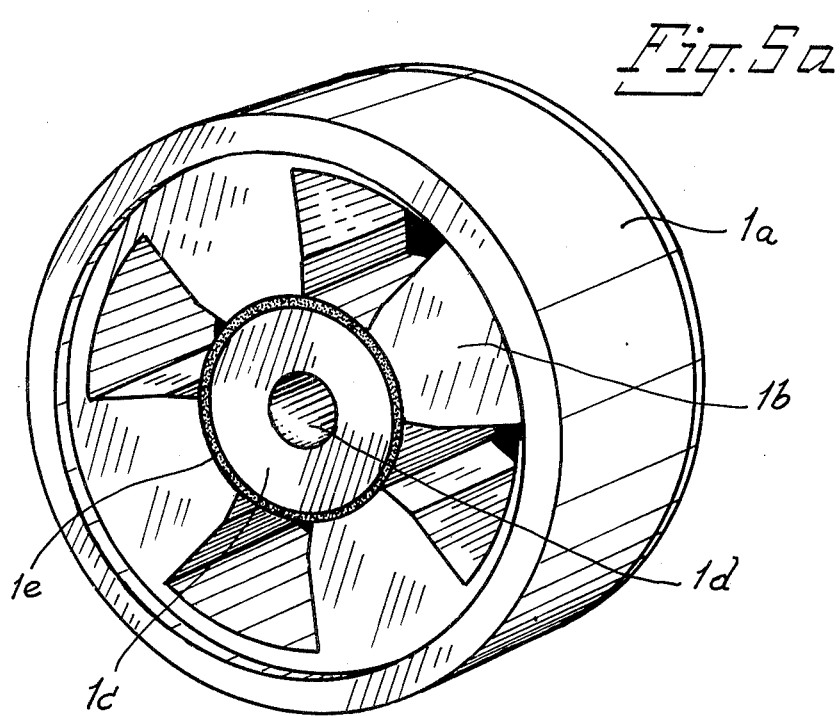
FIG. 5a shows a perspective view of a motor of a type that may be utilized as a drive source for nutrunners in applying the invention, with the rotor being removed from the motor.
Figure 5B:
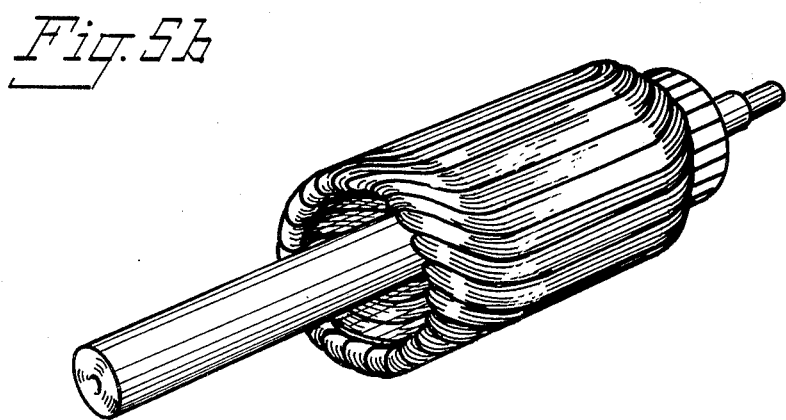
FIG. 5b shows a perspective view of the rotor of the motor illustrated in FIG. 5a, FIG. 6 shows a basic circuit diagram of the motor and of the starting and control circuits connected thereto.

The motor preferably utilized in applying the invention is a motor of so-called moving coil type, of which FIGS. 5a and 5b show an example. In FIG. 5a the designation 1a refers to an external housing, 1b illustrates permanent magnets disposed in said housing, and 1c shows a stationary iron core in the housing, said core being provided with an opening 1d through which the shaft of the rotor illustrated in FIG. 5b subsequently is to be passed, with the rotor winding being introduced into the annular opening 1e of FIG. 5a. A motor of the relevant type is characterized in that it lacks magnetic iron in the core. The iron core is stationary, and the only rotating parts of the moving coil motor are the rotor winding, the commutator, the shaft and the bearings. As the result of the described design, the motor has an extremely low moment of inertia, which is utilized in the tightening sequence, and a very low inductance, thereby attaining a small electric time constant. A permanently magnetized direct-current motor of the type indicated has a linear relationship between torque and current which provides very simple control possibilities. However, none of the indicated tightening methods is dependent of this linear relationship, and it is sufficient to have a well-defined relationship between torque and either current/voltage or current, which means that the present invention is not restricted to motors of the above-mentioned type.

Figure 1:
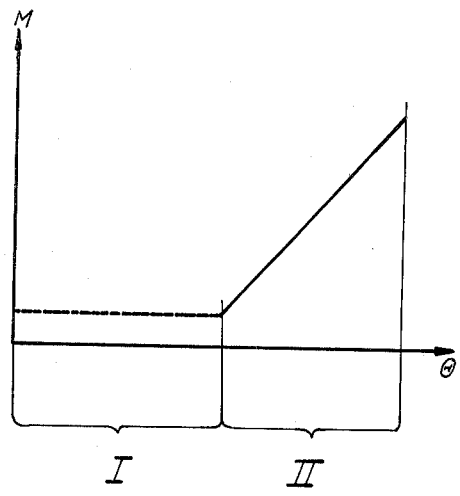
FIG. 1 illustrates the torques of the two phases that may be observed in tightening a bolt joint.
Figure 2:
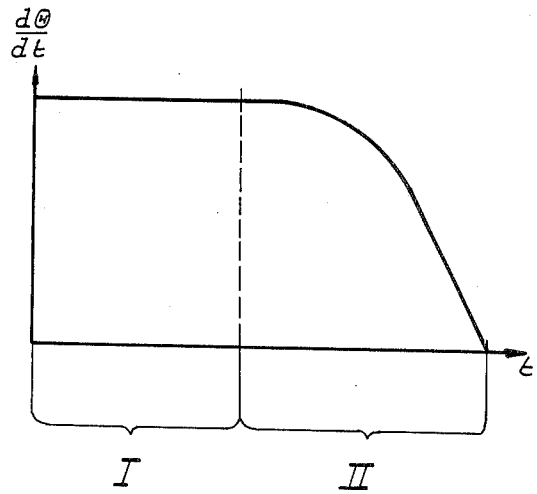
FIG. 2 shows the angular velocity as a function of time for initial threading and tightening, respectively, by means of a motorpowered nutrunner.
Figure 3:
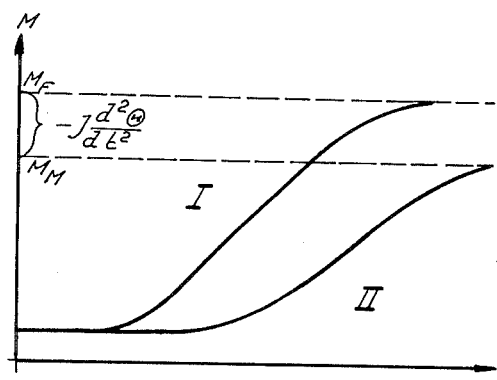
FIG. 3 illustrates the torque M delivered to the joint as a function of time t for a hard and soft joint, respectively.
Figure 4:
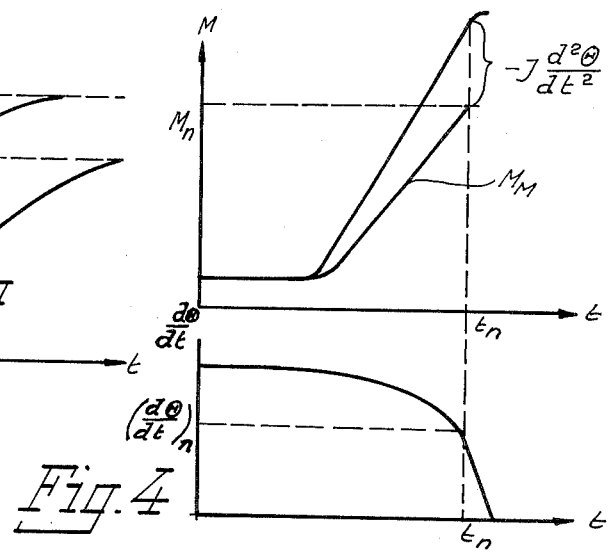
FIG. 4 illustrates the tightening sequence of a hard joint when the motor is shut off or disengaged.
Figure 6:
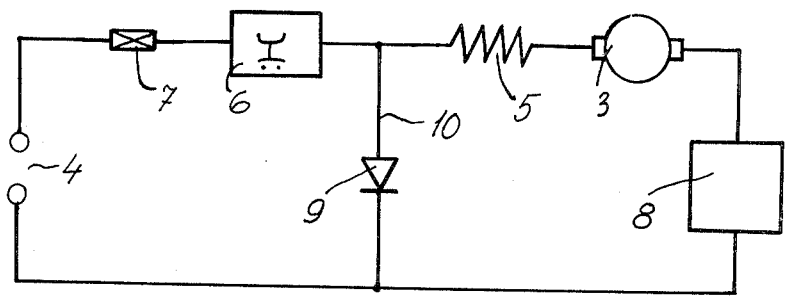

FIG. 6 shows an example of a basic circuit diagram of the motor and of the circuits influencing the latter. The motor 3 is connected to a constant, induction-free source of direct voltage 4 over an external resistor 5. The input voltage is to be chosen such, that the motor has the required number of revolutions per minute in free-running. The mentioned external resistor and the rotor resistance result in the current becoming restricted in starting or in clamped braking.

The motor and thus the nutrunner are started by the actuation of a starting device 6, whereby the current is closed from the source 4 of direct voltage and flows through fuse 7, starting device 6, resistor 5, motor 3, and a control device 8. When the control device 8, the design of which is dependent of the tightening method, provides the information that the tightening sequence is to be terminated, a thyristor 9 (or a corresponding current valve) is fired, whereby on one hand the driving current is conducted past the motor 3 through the lead 10 and on the other hand the motor is short-circuited and consequently braked strongly. In consequence of the low moment of inertia of the motor, the amount of energy stored in the rotating portions of the nutrunner when the motor is shut off is small. As the result of the electric braking only a certain portion of this small stored energy goes out to the joint, whereas the remaining part is dissipated in the resistor 5 in the form of heat.

Figure 7:
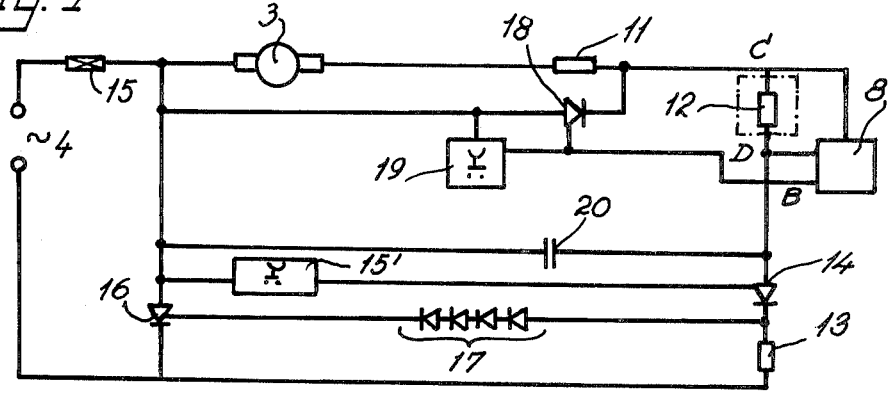
FIG. 7 shows a more detailed embodiment of the circuit of FIG. 6.

FIG. 7 shows a more detailed circuit diagram corresponding to the diagram of FIG. 6 for a particular case. The motor 3 is now to be connected to the constant, induction-free direct-voltage source 4 over external resistors 11, 12 and 13, which for example may have resistances of 1.1 ohms. As an example, it may be assumed that the input voltage of the selected motor is to be approximately 74 volts in order for the motor to have the required number of revolutions per minute in free-running. The resistances of the mentioned external resistors and the motor resistance, which in the relevant case may be for example 1.2 ohms, limit the current to 35–40 ampères in starting or clamped braking.

In starting, a thyristor 14 is triggered by means of a pushbutton 15', whereby a current from the direct-voltage source 4 flows to fuse 15, motor 3, resistors 11, 12 and 13, and thyristor 14. If the current through the motor increases to approximately 36 ampères the motor will stop as the result of the voltage drop over resistor 13 becoming so great that a thyristor 16 is triggered over four diodes 17 connected in series, whereby a capacitor 20 is discharged over thyristor 14 so that the latter is extinguished. During this discharge in the backward direction thyristor 16 also is extinguished.

When the tightening sequence is completed the motor is to stop. A thyristor 18 is then activated, whereby the motor and resistor 11 are short-circuited and the motor is braked strongly. In the meantime, driving current goes past the motor, through the stop thyristor 18, and through resistor 12. The current through resistor 13 will then be approximately 36 ampères, thereby causing the protector consisting of the main thyristor 14 and the extinguishing thyristor 16 to be actuated.

The stopping thyristor 18 may be triggered in two different manners, namely (1) by the stopping button 19 being depressed or (2) as the result of a triggering pulse being provided from a control device 8.

Figure 8:
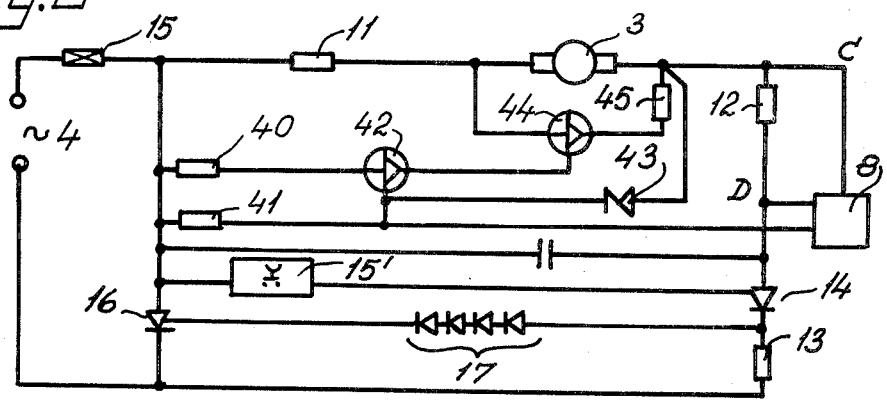
FIG. 8 shows a modification of the circuit of FIG. 7.

FIG. 8 shows a circuit diagram in which the motor is decelerated by controlling the braking current so that a controllable torque is provided when the control device 8 gives a braking command. When a pulse from control device 8 occurs, the lead connection between the control device and a resistor 41 is cut off. In consequence of this lead connection normally being grounded during the initial threading, the potential on the base of a transistor 42 is increased simultaneously with said connection being broken. Current will then flow through a resistor 41 into transistor 42. A greater current will then flow into a transistor 44 through the amplifying circuit consisting of a resistor 40 and transistor 42. The motor 3 will now drive a current to transistor 44 and resistor 45. A zener diode 43 is connected over resistor 45 to the base of transistor 42. When the voltage drop over resistor 45 is balanced by the voltage drop over zener diode 43 the maximum value of the braking current in the motor will be attained. If the base voltage of transistors 42 and 44 is neglected, the braking current will be equal to the zener voltage divided by the resistance of resistor 45. The entire circuit is now self-controlling, and as long as the counter-emf of motor 3 exceeds the voltge drop of transistor 44 and resistor 45 this maximum current will brake the motor with a constant torque.

The electric braking may also be achieved by providing the motor with auxiliary windings which are particularly intended for the braking function and whose connection to a voltage source is controlled by control device 8.

Figure 9:
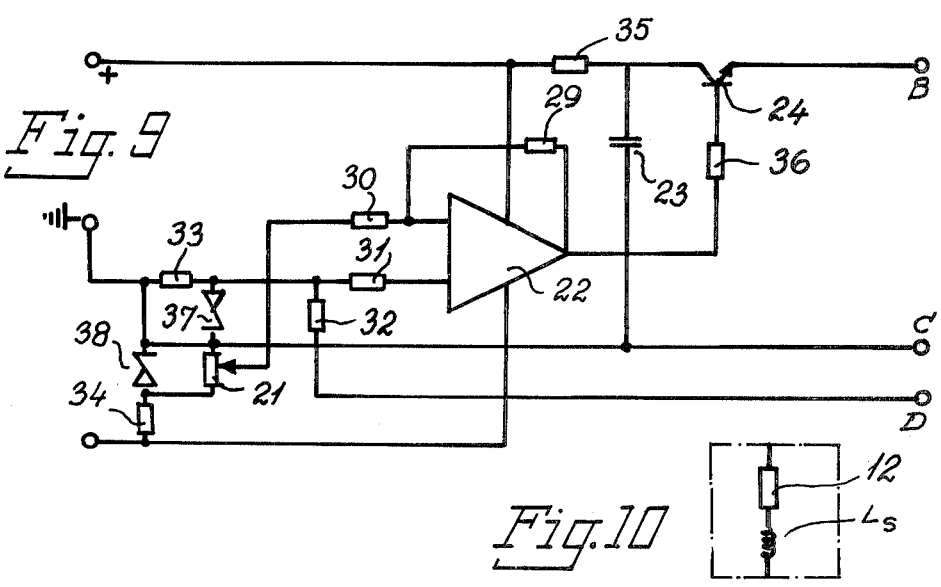
FIG. 9 shows a circuit diagram of a circuit that is utilized in tightening a nut and a screw, respectively, to a predetermined torque in accordance with the above as well as a circuit by means of which it is possible to compensate for a hard joint and a soft joint, respectively.
Figure 11:
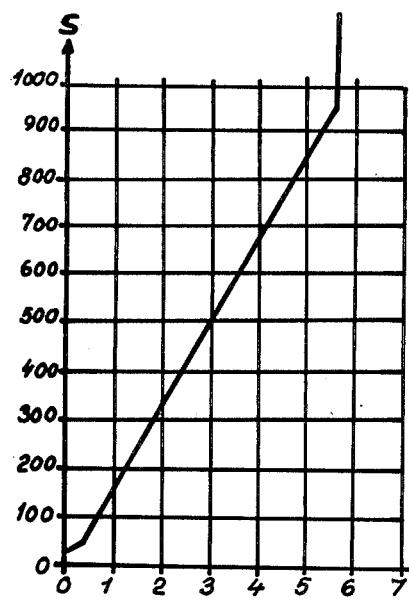
FIG. 11 shows an example of the potentiometer adjustment as a function of the torque, and FIG. 12 schematically shows the nutrunner in its complete state.

FIG. 9 shows the circuit diagram in the event that the tightening torque of the joint is to be controlled. As a well-defined relationship exists between torque and current in the motor, the current through the motor is sensed as the voltage over the shunt resistor 12 of FIG. 7. This voltage is conveyed over terminals C and D to the comparator circuit illustrated in FIG. 9, in which the current through the motor 3 (i.e. the voltage drop over resistor 12) is compared to a reference voltage of a potentiometer 21 in a comparator 22 comprising an operational amplifier of a type known per se, said amplifier being provided with positive feedback over a resistor 29. When coincidence is reached, a capacitor connected to the collector of a transistor 24 is discharged over lead B to the control grid of stopping thyristor 18, which causes the motor to be short-circuited. The resistors 30-36 and the zener diodes 37 and 38 are components for providing the necessary voltage drops and voltage limitations. The setting S of the potentiometer 21 as a function of the delivered torque M of the motor is illustrated in FIG. 11.

Figure 10:
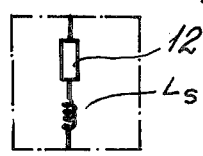
FIG. 10 shows a modification of a portion of the circuit of FIG. 7.

As was mentioned by way of introduction it is desirable to be able to compensate the tightening torque for variations in the hardness of the joints. One way of carrying this out is to connect the inductance-free resistor 12 of FIG. 7 having the resistance of $R_S$ in series with an inductor $L_S$ as illustrated in FIG. 10. Hereby a voltage drop over resistor 12 and inductor $L_S$ is attained which is $R_S \cdot i + L_S (di)/(dt)$, i.e. consideration is also taken of the time dependency of the current, i.e. the torque.

In this manner compensation can be provided for variations in the final tightening torque. Also, it can be shown that a specific value of the inductor $L_S$ automatically provides compensation for all hardnesses of joints.

The invention is not restricted to the method of controlling the tightening sequence by tightening to a predetermined torque. As has been mentioned above, the motor is braked as the result of a triggering pulse from control device 8. This pulse may be derived for example from a torque deriving circuit or an angle sensing circuit if the controlling is carried out by means of so-called yield point controlled tightening or the so-called angle method.

Figure 12:
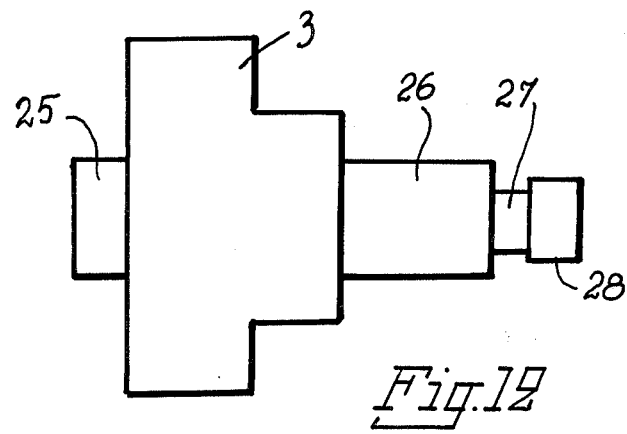

FIG. 12, finally, shows the nutrunner schematically, wherein the designation 25 refers to a tachometer connected to the motor 3, the designation 26 refers to a gear, the designation 27 refers to the driving pin of the outgoing shaft, and 28 is a nut sheath for tightening. Thus, in this case the nutrunner has been provided with a mechanical gear so that an appropriate torque is achieved.

The invention is not restricted to the embodiments described above and illustrated in the drawings, and these embodiments merely comprise examples of the invention and its application.

What is claimed is:

1. An electric nutrunner for tightening screw joints to a predetermined tightening torque or clamping force, said nutrunner comprising:
    voltage supply means;
    motor-starting means coupled to said voltage supply means;
    drive means, including a DC motor, coupled to said motor-starting means, for tightening a screw joint;
    control means coupled to said drive means; and
    means coupling said control means with said voltage supply means;
    said control means including:
        signal generating means for measuring the current flowing through said D.C. motor of said drive means, said signal generating means being responsive to a measured D.C. current value corresponding to said predetermined tightening torque or clamping force being reached for providing a terminating signal for causing the stopping of said D.C. motor, thereby causing the tightening of the screw joint to be terminated; and
        compensating control means coupled to said signal generating means for measuring the growth rate of said current flowing through said D.C. motor and being responsive to said measured growth rate which corresponds to joint stiffness for causing said signal generating means to provide said terminating signal as a function of said measured growth rate, thereby providing compensation for a variation in the terminating torque of the screw joint as the result of varying joint stiffness by varying the time of generation of said terminating signal.

2. The electric nutrunner of claim 1, wherein said signal generating means and compensating control means comprises an inductance-free resistor connected in series with said motor of said drive means and an inductor connected in series with said resistor; a comparator connected across said resistor and inductor for comparing the voltage across said resistor and inductor with a preset reference voltage; and stopping means coupled to said comparator and to said motor, said comparator delivering an output signal to said stopping means upon the occurrence of coincidence of said reference voltage and said voltage across said resistor and inductor for interrupting the tightening sequence of the nutrunner by stopping said motor.

3. The electric nutrunner of claim 1 or 2, comprising means coupled to said control means and to said motor for electrically braking said motor responsive to said terminating signal.

4. The electric nutrunner of claim 3, wherein said braking means includes means for short-circuiting said motor responsive to said terminating signal.

5. The electric nutrunner of claim 1 or 2, wherein said motor comprises permanently magnetized motor having an iron-free rotor.

6. The electric nutrunner of claim 5, wherein said rotor comprises magnets of rare earth metal/cobalt type.

7. The electric nutrunner of claim 1, wherein said motor has a low moment of inertia.

8. An electric nutrunner for tightening screw joints to a predetermined tightening torque or clamping force, said nutrunner comprising:
 voltage supply means;
 motor-starting means coupled to said voltage means;
 drive means, including a DC motor, coupled to said motor-starting means, for tightening a screw joint;
 control means coupled to said drive means; and
 means coupling said control means with said voltage supply means;
 said control means including;
  signal generating means for measuring electrical quantities corresponding to the motor voltage and current of said D.C. motor of said drive means, said signal generating means being responsive to a measured electrical quantity value corresponding to said predetermined tightening torque or clamping force being reached for providing a terminating signal for causing the stopping of said D.C. motor, thereby causing the tightening of the screw joint to be terminated; and
  compensating control means coupled to said signal generating means for measuring the growth rates of said measured quantities corresponding to said motor voltage and current of said D.C. motor and being responsive to said measured growth rates which correspond to joint stiffness for causing said signal generating means to provide said terminating signal as a function of said measured growth rates, thereby providing compensation for a variation in the terminating torque of the screw joint as the result of varying joint stiffness by varying the time of generation of said terminating signal.

9. The electric nutrunner of claim 8, comprising means coupled to said control means and to said motor for electrically braking said motor responsive to said terminating signal.

10. The electric nutrunner of claim 9, wherein said braking means includes means for short-circuiting said motor responsive to said terminating signal.

11. The electric nutrunner of claim 8, wherein said motor comprises a permanently magnetized motor having an iron-free rotor.

12. The electric nutrunner of claim 11, wherein said rotor comprises magnets of rare earth metal/cobalt type.

13. The electric nutrunner of claim 8, wherein said motor has a low moment of inertia.

* * * * *